Figure 5:
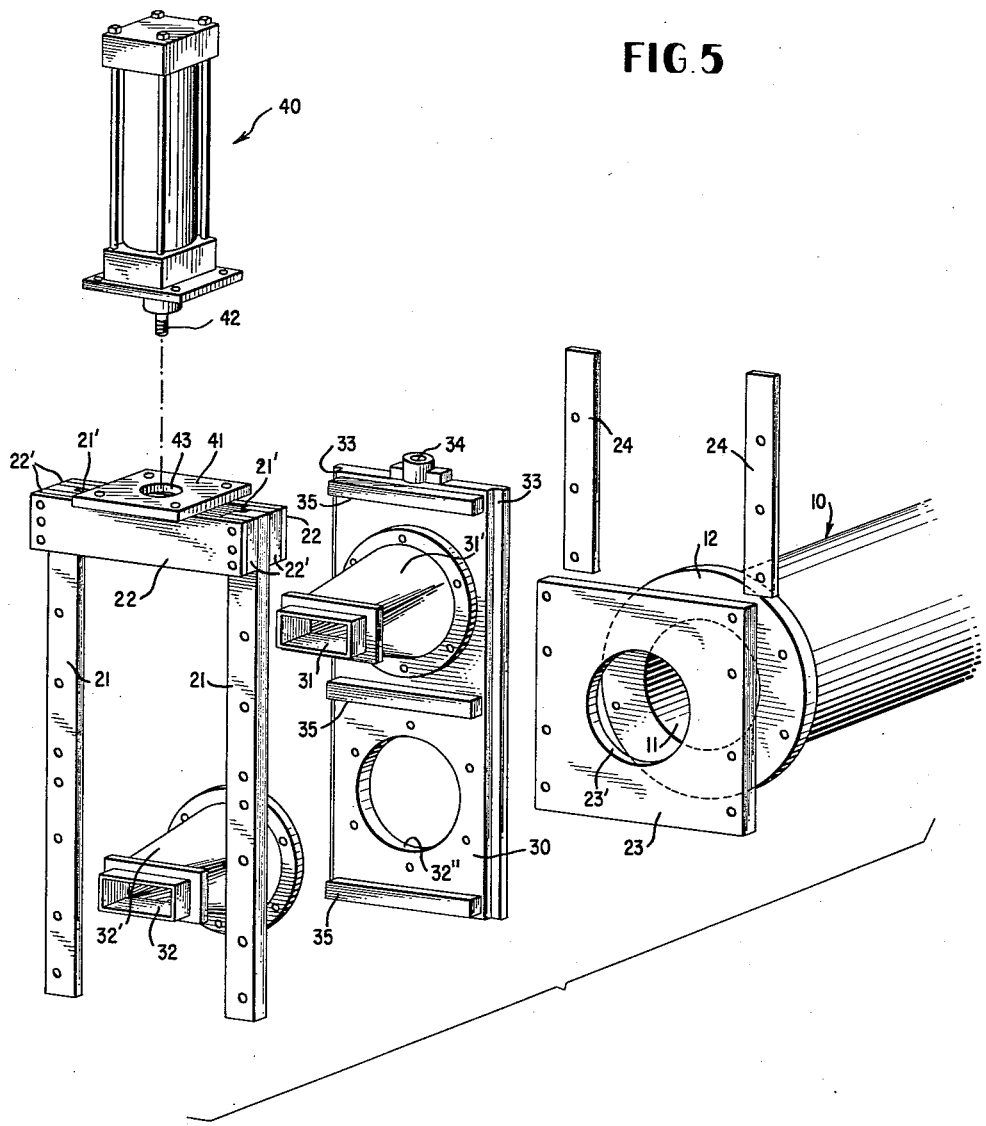

April 28, 1964
C. R. McFALL
3,130,468
BRICK MACHINE DIE CHANGING DEVICE
Filed Sept. 21, 1961
2 Sheets-Sheet 1
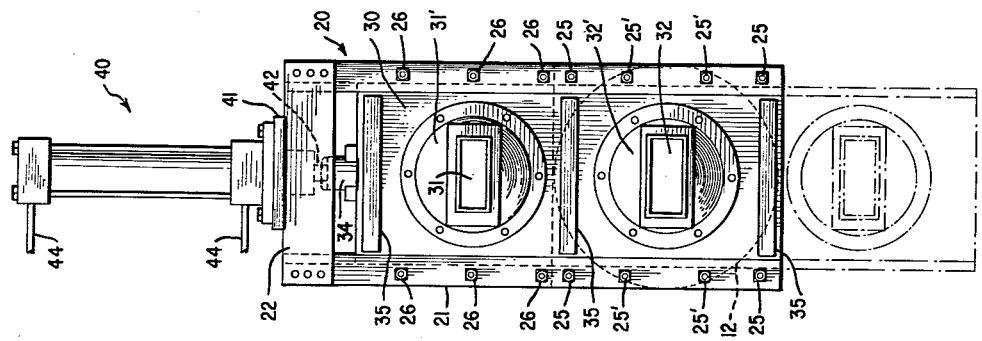
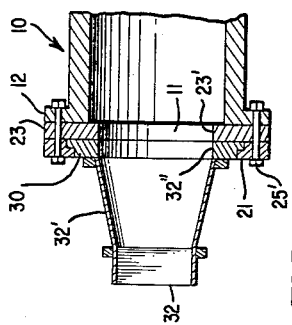
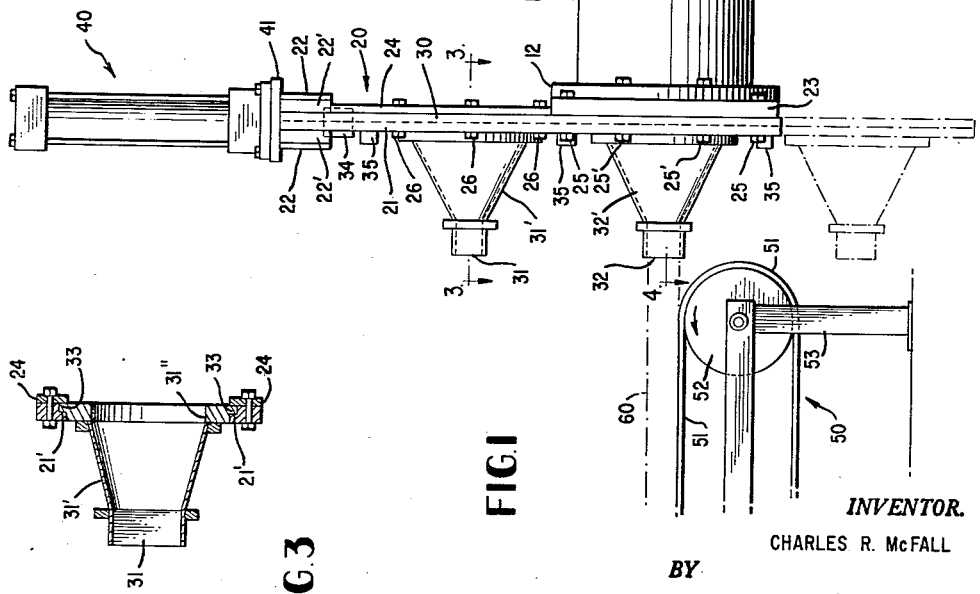
INVENTOR.
CHARLES R. McFALL
BY
ATTORNEY April 28, 1964  C. R. McFALL  3,130,468
BRICK MACHINE DIE CHANGING DEVICE
Filed Sept. 21, 1961  2 Sheets-Sheet 2

INVENTOR.
CHARLES R. McFALL
BY
ATTORNEYS 3,130,468
BRICK MACHINE DIE CHANGING DEVICE
Charles R. McFall, Johnson City, Tenn., assignor to Johnson City Foundry and Machine Works, Inc., Johnson City, Tenn., a corporation of Tennessee
Filed Sept. 21, 1961, Ser. No. 139,684
1 Claim. (Cl. 25—17)

This invention relates to the production of bricks, and has utility in extruding brick clay into a column suitable for cutting into individual bricks. More particularly, the invention relates to such a device which provides means for selectively obtaining a desired one of a plurality of cross-sectional sizes of the clay column, and changing from one cross-sectional size to another with speed and efficiency.

In the art of manufacturing bricks for construction purposes, machines are often employed which form a column of clay having the cross section of the desired brick size. These machines form the column of the brick clay by an extrusion process in which the clay, while in plastic condition, is forced by means of a screw, ram, or similar device through a die opening defining the cross-sectional contour of the brick to be produced. Necessarily, the attachment of the extrusion die to the outlet orifice end of the machine is accomplished by means capable of withstanding the high pressure attending the clay extrusion. Such means may include, for example, bolts, clamps, or the like. When it becomes necessary to change from the production of a brick of a given cross-sectional size to a brick of a different cross-sectional size, it has heretofore been necessary to remove the extrusion die from the outlet orifice end of the extrusion machine, and to replace it with a die of different cross-sectional size. One troublesome problem in brick production has heretofore been the time necessary to perform this die changing operation, which usually involves detaching or releasing the means securing the die, affixing suitable supporting devices to lift the heavy die away from the extrusion machine, then moving the die into position and replacing the means fixing it in place. The operation has been known to consume a half hour or more, during which time the extrusion machine is out of operation, and valuable production time is lost.

It is an object of this invention to provide an improved brick clay extrusion device providing means by which extrusion dies may be changed with speed and efficiency.

A further object of this invention is to provide a brick clay extrusion device having improved means for selectively obtaining a desired one of a plurality of cross-sectional brick sizes.

Another object of this invention is to provide means for greatly reducing the loss of productive time which has heretofore attended the die changing operation of a brick extrusion machine.

Still another object of this invention is to provide an improved brick extrusion device providing means for supporting one die in place during operation of the machine, while another die is in position for changing or cleaning and maintenance and yet is ready for instantaneous movement into operative position.

Generally, and in accordance with one aspect of the invention, there is provided, with a brick clay extrusion machine, a plate carrying a plurality of extrusion dies each of a different size opening, means mounting the plate adjacent the extrusion machine outlet orifice for slidable movement in a plane perpendicular to the axis of said orifice, and power means to slide the plate so as to position a desired one of the dies in line with the orifice.

Further objects, features and attending advantages of the invention will become apparent by reference to the following detailed description and accompanying drawings, in which:

FIGURE 1 is a partial view in side elevation showing the apparatus of this invention, FIGURE 2 is a front view of the apparatus of FIGURE 1, FIGURE 3 is a sectional view taken on line 3—3 of FIGURE 1, FIGURE 4 is a sectional view taken on line 4—4 of FIGURE 1, FIGURE 5 is an exploded view in perspective of the apparatus shown in the foregoing figures.

With reference to FIGURES 1, 2, 4 and 5, there is generally indicated at 10 the discharge end of a brick clay extrusion machine. As seen in FIGURES 4 and 5, extrusion machine 10 has an outlet orifice 11. The operative details of the extrusion machine, itself, form no part of this invention, and therefore will not be described. For purposes of illustration, however, the extrusion machine may be of the screw type, and is shown as circular in cross section. Extrusion machine 10 is provided with a flange 12 surrounding outlet orifice 11, extending radially outward therefrom, and lying in a plane perpendicular to the axis of the orifice. The purpose of flange 12 will be described more fully below.

At the discharge end of extrusion machine 10 there is fixed a framework, generally indicated in FIGURES 1 and 2, by the numeral 20. As best seen in FIGURE 5, this framework comprises a first pair of parallel rails 21, joined together at the top front and rear by cross braces 22. Braces 22 may be joined to rails 21 by any suitable means, such as by bolting, and may be spaced from the surface of rails 21, as by spacer blocks 22', for a purpose to be described below.

Rails 21 are provided with longitudinal grooves 21', best shown in FIGURES 3, 4, and 5, which may form a right angle in cross section, and are cut into the edges of rails 21 on the corners interior with respect to one another and facing extrusion machine 10.

Framework 20 further comprises a plate 23, best seen in FIGURE 5, having central circular opening 23' and a second pair of parallel rails 24. Rails 24 are spaced apart by a distance equal to the spacing between parallel rails 21.

In the assembly of framework 20, plate 23 is attached by any suitable means such as bolts to extrusion machine 10. In the embodiment illustrated, this attachment is accomplished by bolting the plate 23 to flange 12 of extrusion machine 10. Rails 21 are secured against plate 23 and rails 24 are secured against rails 21 in face-to-face relation. The entire framework is thus rigidly attached to extrusion machine 10. The attachment of the frame work members to one another and to the extrusion machine may be accomplished by any suitable means. However, in the embodiment illustrated, and as best shown in FIGURES 1 and 2, the attachment is accomplished by means of bolts 25, 25' and 26.

Bolts 25 and 25' join the lower portion of rails 21 to plate 23. Bolts 25' also join plate 23 to flange 12 of the extrusion machine 10. Bolts 26 join the upper portion of rails 21 to rails 24. Bolts, rather than rivets or welding, are preferably used, since they provide a strong and rigid attachment of the framework members together and to the extrusion machine, and yet permit disassembly for purposes of replacement or maintenance.

Further in accordance with the invention there is provided, as best shown in FIGURE 5, a plate 30. The purpose of plate 30 is to carry a plurality of extrusion dies each of different size die opening. In the embodiment illustrated, two dies 31 and 32 are shown, although it will be apparent that, by certain modifications, a plate carrying more than two dies may be employed. Die 31 is of one given size determining the cross-sectional contour of a desired brick form, while die 32 is of a different size to determine the cross-sectional contour of a second brick form. The die openings 31 and 32 are carried by frusto-conical die members 31' and 32', respectively, which are, in turn, attached over suitable openings 31" and 32" cut into plate 30. Attachment of the conical members 31' and 32' to plate 30 may be accomplished in any suitable manner, but is illustrated in the preferred embodiment as being accomplished by means of bolts, thus providing means for removal of the dies for replacement or maintenance.

Rigidity may be added to plate 30 by rigidly fixing, as by welding, a plurality of bars 35 laterally across the face of the plate. Since it is desirable to be able to slidably remove plate 30 from the framework 20, the cross braces 22 are spaced from rails 21 by the spacing blocks 22' to provide sufficient clearance between the interfaces of braces 22 to permit plate 30 with the bars 35 affixed thereto to be withdrawn.

The longitudinal side edges of plate 30 are cut out or grooved to provide an extension or tongue 33 narrower than the thickness of plate 30, and just sufficiently narrow so that they fit slidably within the grooves 23 of rails 21, described above and against the face of the rails 24.

With reference to FIGURES 1, 2, and 5, there is provided a linear power stroke member 40, which is preferably a hydraulic cylinder. Cylinder 40 has a piston which is actuated hydraulically by fluid supplied at either end by way of conduits 44. Control of the hydraulic piston within cylinder 40 is accomplished by a suitable valve means, not shown. A plate 41 is mounted across braces 22 and secured thereto, as by welding or other suitable attachment means. Cylinder 40 is mounted upon plate 41 so that the linear power stroke is directed parallel to rails 21 and 24 and perpendicular to an axis drawn through outlet orifice 11 of extrusion machine 10.

As best shown in FIGURE 5, when the cylinder 40 is placed upon plate 41, a rod 42 connecting with the piston or similar hydraulically actuated means within cylinder 40 is received through an opening 43 in plate 41. The end of rod 42 is threaded. With cylinder 40 in position as shown in FIGURES 1 and 2, rod 42 is threadably received within a sleeve 34 integral with or rigidly attached to plate 30. With this connection between rod 42 and plate 30, actuation of the hydraulic piston of cylinder 40 up or down will result in the simultaneous raising and lowering of plate 30.

In the operation of the invention apparatus, plate 30 may be assumed initially to be in the upper of two positions, as illustrated by the solid lines of FIGURE 1. With plate 30 in this position, extrusion die 32 will be aligned with the outlet orifice 11 of extrusion machine 10. The extrusion machine forces the brick clay, in plastic condition, out of orifice 11, through opening 23' of plate 23, through opening 32" of plate 30, through cone 32' and through the extrusion die opening 32. The clay thus extruded may be taken up or collected in any desired fashion, but for purposes of illustration, there is illustrated in FIGURE 1 a conveyor generally indicated at 50 and comprising an endless conveyor belt 51 passing around a roller 52 supported by a framework 53. The extruded column of brick clay, indicated in phantom lines at 60 of FIGURE 1, is supported by the belt 51, which travels at a speed equal to the extrusion rate of machine 10. The column of brick clay 60 is cut into individual bricks of desired length by suitable means, not shown.

Should it become desirable to change from production of bricks having the cross-sectional size determined by die opening 32 to bricks having the cross-sectional size determined by die opening 31, it is merely necessary to actuate the piston of hydraulic cylinder 40 so as to thrust rod 42 downwardly. The travel of rod 42 is sufficient so that, in its downward extension, extrusion die 31 is brought into alignment with the outlet orifice 11 of extrusion machine 10. At this point, extrusion die 32 is located in the phantom line position shown in FIGURE 1. Similarly, should it become desirable to return to the use of extrusion die 32, it will be apparent that, by suitably actuating the piston of hydraulic cylinder 40, the plate 30 may be drawn upward, returning it to the solid line position of FIGURE 1.

It will be apparent that rails 24 constitute the back-up or retaining means holding tongues 33 of plate 30 into sliding engagement with grooves 21' of rails 21. An advantage accrues to the use of rails 24 rather than a solid plate such as 23 in that, with plate 30 in the "up" position, access may be had to the inoperative extrusion die 31 for purposes of cleaning and maintenance. Similarly, with plate 30 in the "down" position, access may be had from beneath to inoperative extrusion die 32 to perform similar cleaning and maintenance functions.

Since extrusion dies 31 and 32 are preferably attached to plate 30 by means such as bolts, permitting detachment, it will be apparent that if a third die size is desired, it may be installed in place of the inoperative die without interrupting operation of the machine during use of the operative die. Once the third die has been installed in the inoperative position, it is then merely necessary to actuate plate 30 so as to move the new die into operative position.

In the light of the foregoing description, it will be apparent that the apparatus of this invention provides a means for selectively obtaining a column of extruded brick clay having one of at least two cross-sectional sizes, and provides means for changing from one to the other with a minimum of operational delay. It will also be apparent that selectivity may be provided between more than two die sizes by the interchangeability of the inoperative die, or by modification of the illustrated apparatus in which the die carrying plate would carry the desired number and selection of dies, all aligned so as to intersect the axis of the extrusion machine outlet orifice upon reciprocation of the plate. The number of such dies would be limited only by the practicability of usage and the effective length of stroke of the power means 40.

While I have shown and described the invention in the single embodiment illustrated, it will be obvious to those skilled in the art that other modifications may be made without departing from the scope of the invention which is defined solely by the appended claim.

I claim:

In an apparatus for manufacturing bricks the combination which comprises a brick clay extrusion machine having a generally cylindrical conduit with an outlet at one end and an outwardly extending flange around said outlet, an orifice plate affixed to said flange and covering said outlet, said plate having an extrusion orifice therethrough, a reciprocable die support plate mounted across said orifice plate and defining first and second openings through said support plate, a pair of guide rails affixed to opposite sides of said orifice plate, said rails having spaced apart flange portions extending inwardly across and continuously along the full length of the outside edges of said support plate, a plurality of reinforcing bars fixed to the outer face of said support plate, said bars being transverse to said rails and terminating inside of said flanges, a hydraulic cylinder to reciprocate said support plate to selectively align either of said openings with said orifice, a pair of hollow frusto-conical die members having wide base portions positioned against said support plate over said openings between said flanges, said die members extending axially outwardly beyond said flanges and terminating in die outlets of different sizes to extrude brick columns of correspondingly different sizes, separable threaded fasteners individually and removably connecting each of said die members to said support member, said separable fasteners being accessible to permit individual removal of each of said die members when the other die member is operatively aligned with said orifice so that the non-operative die member may be replaced by another die member without interruption in the extrusion of brick columns from said machine.

References Cited in the file of this patent

UNITED STATES PATENTS

| | | |
|---|---|---|
| 1,004,406 | Frost | Sept. 26, 1911 |
| 2,070,096 | Smith | Feb. 9, 1937 |
| 2,661,497 | Birmingham | Dec. 8, 1953 |
| 3,002,615 | Lemelson | Oct. 2, 1961 |